(12) United States Patent
Fujino et al.

(10) Patent No.: US 7,252,689 B2
(45) Date of Patent: Aug. 7, 2007

(54) METHOD FOR FABRICATING LITHIUM ION SECONDARY BATTERY

(75) Inventors: Akiko Fujino, Hirakata (JP); Shinji Nakanishi, Hirakata (JP); Hizuru Koshina, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 389 days.

(21) Appl. No.: 10/378,610

(22) Filed: Mar. 5, 2003

(65) Prior Publication Data

US 2003/0167627 A1    Sep. 11, 2003

(30) Foreign Application Priority Data

Mar. 7, 2002  (JP) .............................. 2002-061445

(51) Int. Cl.
*H01M 4/82*  (2006.01)
*H01M 6/00*  (2006.01)
*H01M 2/18*  (2006.01)

(52) U.S. Cl. .................... 29/623.1; 29/623.5; 429/133

(58) Field of Classification Search ............... 429/133, 429/162, 166; 29/623.1–5
See application file for complete search history.

(56) References Cited

U.S. PATENT DOCUMENTS 6,053,953 A * 4/2000 Tomiyama et al. ........ 29/623.1

FOREIGN PATENT DOCUMENTS

| EP | 0 969 541 A1 | * | 7/1999 |
|---|---|---|---|
| JP | 11-31531 | * | 2/1999 |
| JP | 11-86844 | | 3/1999 |
| JP | 11-345606 | | 12/1999 |
| JP | 2000-164259 A | | 12/2001 |

* cited by examiner

*Primary Examiner*—Stephen Kalafut
*Assistant Examiner*—Julian Mercado
(74) *Attorney, Agent, or Firm*—McDermott Will & Emery LLP

(57) ABSTRACT

By using a winding type electrode plate assembly resistant to displacement by wind-up and buckling, a lithium ion secondary battery, capable of suppressing deterioration in cycle and storage characteristic caused by expansion and shrinkage of the electrode plate due to charge/discharge cycles or by generation of gas during storage at high temperatures or the like, is accomplished. An electrode plate A comprising a binder mainly composed of a polymer material "a" and an electrode plate B, having the opposite polarity to the electrode plate A, with a porous polymer layer mainly composed of the polymer material "a" or a copolymer of the polymer material "a" formed thereon, are wound up in flat form to give a flat electrode plate assembly, which is soaked in a non-aqueous electrolyte and then heated and cooled, with the soaked state maintained, while pressure is applied in the direction of the thickness of the flat electrode plate assembly, to integrate the electrode plate assembly.

4 Claims, 1 Drawing Sheet

METHOD FOR FABRICATING LITHIUM ION SECONDARY BATTERY

BACKGROUND OF THE INVENTION

The present invention relates to a method for fabricating a winding type lithium ion secondary battery. In particular, the present invention relates to a method for fabricating a lithium ion secondary battery using a winding type electrode plate assembly formed by integrating a separator with electrode plates.

As lithium ion secondary batteries mainly used have been batteries having a structure obtained by winding up a positive electrode plate and a negative electrode plate together with a separator such as a microporous polyethylene sheet to prepare a winding type electrode plate assembly and then accommodating this electrode plate assembly and a non-aqueous electrolyte in a predetermined case.

Moreover, from the perspective of accommodating properties in devices, rectangular batteries having a shape obtained by: applying pressure to an electrode plate assembly wound up in cylindrical form or winding up an electrode plate assembly in flat form to prepare a flat winding type electrode plate assembly; and accommodating it in a flat metal battery case of a rectangular or long-elliptic cross section, have been preferably employed as the winding type batteries.

Principally from the viewpoint of safety, lithium ion secondary batteries, so-called polymer batteries, having a configuration of disposing a porous polymer layer between a positive electrode plate and a negative electrode have been attracting attention in recent years. A typical lithium ion secondary battery of this type is a laminated type battery comprising a laminated electrode plate assembly obtained by laminating and integrating the platy positive electrode plate and negative electrode plate via the porous polymer layer.

Furthermore, because of an increasingly demand for safety associated with thinner separators for higher capacity, winding type batteries obtained by forming a porous polymer layer on an electrode plate and then winding up the whole to prepare a winding type electrode plate assembly have been proposed in, for example, Japanese Laid-Open Patent Publications No. 11-345606 and No. 11-86844. In the process of preparing the winding type electrode plate assembly, however, the entire electrode plates can be integrated only after the electrode plate assembly is wound up.

On the contrary, since an electrode plate assembly prepared by integrating and winding up one of the electrode plates and the separator is not integrated as a whole, expansion and shrinkage of the electrode plates due to charge/discharge cycles, or generation of gas during storage at high temperatures and the like causes the gas to remain within the electrode plate assembly or the electrode plate assembly to deform, leading to deterioration in characteristics.

From the aforesaid perspective, it is an object of the present invention to provide a method for fabricating a lithium ion secondary battery capable of suppressing deterioration in cycle characteristic as well as storage characteristic resulted from expansion and shrinkage of an electrode plate due to charge/discharge cycles or generation of gas during storage at high temperatures and the like, by using a flat winding type electrode plate assembly, which can be wound up and further is integrated at the time of completion thereof.

BRIEF SUMMARY OF THE INVENTION

The present invention relates to a method for fabricating a lithium ion secondary battery comprising: an electrode-plate preparation step (a) for preparing an electrode plate A comprising an active material capable of absorbing and desorbing lithium ions and a binder mainly composed of a polymer material "a", and an electrode plate B comprising an active material capable of absorbing and desorbing lithium ions and a binder mainly composed of a polymer material "b"; a separator preparation step (b) for preparing a separator by forming on the electrode plate B a porous polymer layer mainly composed of the polymer material "a" or a copolymer of the polymer material "a"; an electrode-plate-assembly formation step (c) for forming a flat electrode plate assembly by laminating in mutual opposition the electrode plate A and the electrode plate B via the separator to be a laminate and winding up the laminate in flat form; a soakage step (d) for soaking the flat electrode plate assembly in a non-aqueous electrolyte by accommodating the flat electrode plate assembly and the non-aqueous electrolyte in a battery case; and an integration step (e) for integrating the flat electrode plate assembly by heating the flat electrode plate assembly still in the soaked state at a heating temperature of 80° C. or higher, followed by cooling, while applying pressure in a direction of thickness of the flat electrode plate assembly.

It is preferable that the polymer material "a" is polyvinylidene fluoride.

It is preferable that the integration step (e) is a step for integrating the flat electrode plate assembly by heating the flat electrode plate assembly still in the soaked state at a heating temperature of 80 to 100° C., followed by cooling to room temperature, while applying pressure of 1 to 50 kg/cm$^2$ in a direction of thickness of the flat electrode plate assembly.

It is preferable that after the soakage step (d), the flat electrode plate assembly is adjusted to be in a state of indicating an open-circuit voltage of 3.5 V or higher, and then the integration step (e) is conducted, with the aforesaid state maintained.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
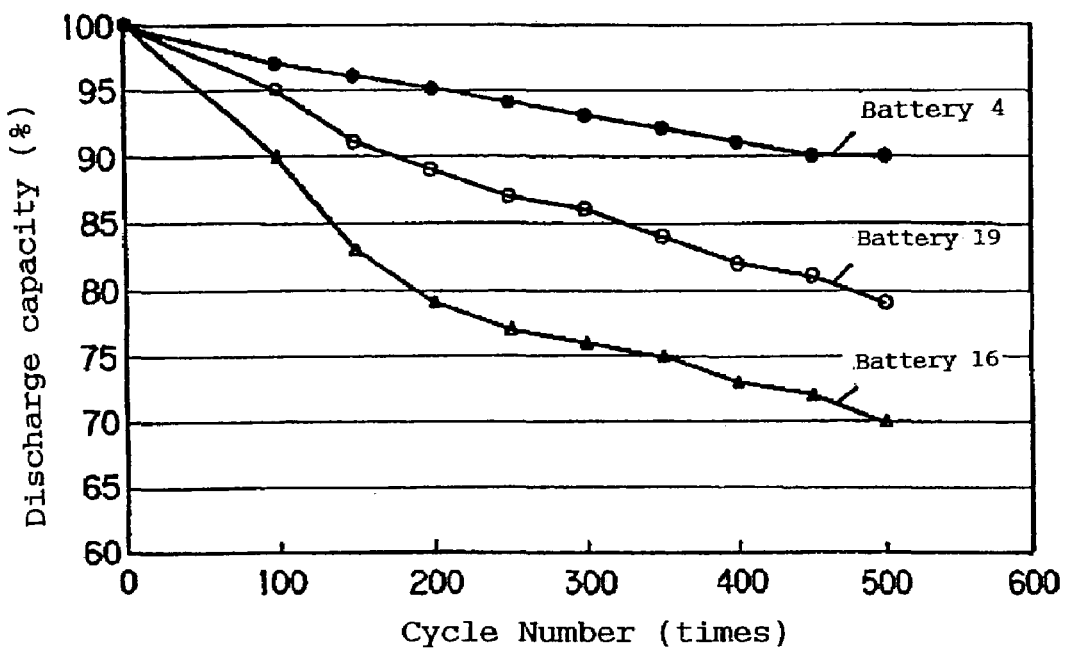
FIG. 1 is a graph representing the cycle number-discharge capacity relationships of the batteries in the example and the comparative example.

The present invention relates to a method for fabricating a lithium ion secondary battery comprising: an electrode-plate preparation step (a) for preparing an electrode plate A comprising an active material capable of absorbing and desorbing lithium ions and a binder mainly composed of a polymer material "a", and an electrode plate B comprising an active material capable of absorbing and desorbing lithium ions and a binder mainly composed of a polymer material "b"; a separator preparation step (b) for preparing a separator by forming on the electrode plate B a porous polymer layer mainly composed of the polymer material "a" or a copolymer of the polymer material "a"; an electrode-plate-assembly formation step (c) for forming a flat electrode plate assembly by laminating in mutual opposition the electrode plate A and the electrode plate B via the separator to be a laminate and winding up the laminate in flat form; a soakage step (d) for soaking the flat electrode plate assembly in a non-aqueous electrolyte by accommodating the flat electrode plate assembly and the non-aqueous electrolyte in a battery case; and an integration step (e) for integrating the flat electrode plate assembly by heating the flat electrode plate assembly still in the soaked state at a heating temperature of 80° C. or higher, followed by cooling, while applying pressure in a direction of thickness of the flat electrode plate assembly.

Particularly in the electrode-plate-assembly preparation step (c), since the electrode plate A and the electrode plate B integrated with the porous polymer layer detach from each other, they are unlikely to be displaced when wound up. Further, the binder of the electrode plate A and the porous polymer layer are comprised of an identical polymer material or copolymer thereof. Even after the formation of the electrode plate assembly in the electrode-plate-assembly formation step (c), therefore, the electrode plate A and the porous polymer layer are welded to each other in the integration step (e), resulting in integration of the electrode plate assembly. The use of the electrode plate assembly as thus integrated for a lithium ion secondary battery enables suppression of deterioration in cycle characteristic and storage characteristic caused by expansion and shrinkage of the electrode plate due to charge/discharge cycles or by generation of gas during storage at high temperatures and the like. A method for fabricating a lithium ion secondary battery in accordance with the present invention will be described below in order of step.

(a) Electrode-Plate Preparation Step

First, in the electrode-plate preparation step (a), an electrode plate A comprising an active material capable of absorbing and desorbing lithium ions and a binder mainly composed of a polymer material "a" and an electrode plate B comprising an active material capable of absorbing and desorbing lithium ions and a binder mainly composed of a polymer material "b" are prepared.

The electrode plate A may be either a positive electrode or a negative electrode. Naturally, the electrode plate B having the opposite polarity to the electrode plate A is the negative electrode when the electrode plate A is the positive electrode, whereas the electrode plate B is the positive electrode when the electrode plate A is the negative electrode. As for the active material capable of absorbing and desorbing lithium ions, conventionally known ones can be used for both the positive electrode and the negative electrode. As the positive electrode active material preferably used is lithium-containing transition metal oxide such as $LiCoO_2$; as the negative electrode active material preferably used are various sorts of graphite such as artificial graphite and natural graphite with the surface thereof reformed.

The examples of the polymer material "a" and the polymer material "b" to be used may include conventionally-known polymer materials for an electrode plate binder such as polyethylene (PE), polyvinylidene fluoride (PVdF) and styrene butadiene rubber (SBR). However, a caution is needed not to use a polymer material such as SBR, which decomposes under high pressure, when the polymer material "a" or the polymer material "b" is used for the positive electrode.

It should be noted that simultaneous preparation of the electrode plate A and the electrode plate B is not necessarily required. In particular, the electrode plate A is not subjected to the separator preparation step and it can thus be prepared after the preparation of the electrode plate B and the subsequent preparation of a separator on the electrode plate B.

Above all, the polymer material "a" is preferably PVdF.

In the method for fabricating a lithium ion secondary battery in accordance with the present invention, as thus described, thermoplastic materials such as polyethylene, polypropylene and PVdF or the precursors thereof, which are stable against a non-aqueous electrolytic solution and electrochemically stable, can be used as the polymer material. Among them, PVdF and a copolymer of PVdF and hexafluoropropylene (HFP) are preferred as the polymer material in terms of both the ion conductivity and bonding property of the porous polymer layer. Especially when the polymer material "a" is used for the positive electrode, the aforesaid materials are particularly preferable materials as being stable at the positive electrode with high potentials.

(b) Separator Preparation Step

Next, in the step (b), a porous polymer layer mainly composed of the polymer material "a" or a copolymer of the polymer material "a" is formed on the electrode plate B to prepare a separator.

Any method may be applied to the formation of the porous polymer layer on the electrode plate B so long as the porous polymer layer and the electrode plate B can be sufficiently bonded to each other. There is for example a method in which the polymer material "a" or the copolymer thereof is dissolved in a solvent such as N-methylpyrrolidone (NMP), the resultant solution is applied onto the electrode plate B and then the solvent is removed by drying or the like to make the polymer layer porous and, at the same time, bond the polymer layer to the electrode plate B. There is also another method in which, instead of conducting the application, the electrode plate B is dipped in a polymer solution reservoir and then the solvent is removed by drying or the like to make the polymer layer porous and, at the same time, bond the polymer layer to the electrode plate B.

In those methods, the bonding between the porous polymer layer and the electrode plate B is sufficiently secured because of the formation of the porous polymer layer directly on the electrode plate B. For this reason, the polymer material "b" as the main component of the binder of the electrode plate B and the polymer material "a", or the copolymer thereof, as the main component of the porous polymer layer are not necessarily required to be identical. With regard to only the bonding between the porous polymer layer and the electrode plate B, however, it is desirable that the polymer material "a" and the polymer material "b" are identical or similar to one another. As to selection of the polymer material "b", a decision may be made with other factors such as battery characteristics and cost taken into consideration.

In this separator preparation step (b), while the porous polymer layer may be formed on the surface of either the positive electrode or the negative electrode, as described above, it is generally preferable in a winding type electrode plate assembly to form the porous polymer layer on the surface of the negative electrode because the negative electrode has a larger area than the positive electrode. It is therefore preferable that the electrode plate A is the positive electrode and the electrode plate B is the negative electrode.

(c) Electrode-Plate-Assembly Formation Step

In the electrode-plate formation step (c), the electrode plate A and the electrode plate B are laminated in mutual opposition via the separator to be a laminate, which is then wound up in flat form to give a flat electrode plate assembly.

With a porous polymer layer used as the separator here, the electrode plate A and the electrode plate B are laminated in mutual opposition and the resultant laminate is wound up in flat form. Since the electrode plate A and the porous polymer layer are not bonded to each other at this moment, displacement by wind-up or buckling, which may occur when an integrated electrode plate assembly is wound up, is unlikely to occur.

(d) Soakage Step

Next, the flat electrode plate assembly and a non-aqueous electrolyte are accommodated in a battery case so that the flat electrode plate assembly is soaked in the non-aqueous electrolyte.

First, the flat electrode plate assembly and a non-aqueous electrolyte are accommodated in a battery case so that the electrode plate assembly is soaked in the non-aqueous electrolyte. As for the battery case, one made of aluminum foil laminated with a resin, or one in rectangular shape made of iron or aluminum is preferably used.

While conventionally-known ones can be used as the non-aqueous electrolyte, a non-aqueous electrolyte comprising a mixed solvent of cyclic carbonate and linear carbonate as well as a non-aqueous electrolyte obtained by dissolving lithium salt such as $LiPF_6$ in an organic solvent such as cyclic lactone are used excellently from the viewpoint of excellent battery characteristics.

The case used here is arbitrarily selected. It may be a final battery(cell) case, or possibly the other case than the final cell case, such as a case made of a resin film, from which the electrode plate assembly is shifted into the final cell case after completion of the later-described integration step (e).

(e) Integration Step

Finally, the flat electrode plate assembly still in the aforesaid soaked state is heated at a heating temperature of 80° C. or higher and then cooled, while pressure is applied in the direction of thickness of the flat electrode plate assembly, to integrate the flat electrode plate assembly.

The flat electrode plate assembly still in the soaked state is heated while pressure is applied in the direction of the thickness thereof. At this time, the application of pressure allows adhesion between the electrode plate A and the porous polymer layer. Moreover, the heating of the electrode plate assembly in the soaked state at a temperature of 80° C. or higher leads to melting of the polymer material "a" which is a main component of the binder of the electrode plate A and the polymer material "a" or the copolymer thereof which is the main component of the porous polymer layer due to the existence of the non-aqueous electrolyte, and the subsequent cooling of the electrode plate assembly leads to easy welding between the electrode plate A and the porous polymer layer because they comprise the same sort of polymer material. As a result, a flat electrode plate assembly with a positive electrode, a negative electrode and a separator integrated is obtained.

The method for applying pressure is also arbitrarily selected. When a battery case having no drag to the direction of the thickness thereof, such as a case made of a resin film or a case made of an aluminum foil laminated with a resin, is used, for example, pressure can be applied to a flat electrode plate assembly by applying pressure to the aforesaid case in the state of accommodating the flat electrode plate assembly therein. Further, when the case having no drag to the direction of thickness thereof is used, a spacer may be disposed in the periphery of the case.

On the other hand, a flat-rectangular metal case having drag to the direction of the thickness thereof can also be used. In this instance, the flat electrode plate assembly may be inserted into the metal case after being applied pressure. It is also possible to use a case having drag to a load when having a predetermined thickness.

Specifically, it is preferable that the flat electrode plate assembly is heated at a temperature of 80 to 100° C. and then cooled down to room temperature while pressure of 1 to 50 $kg/cm^2$ is applied in the direction of the thickness thereof. The preferable pressure to be applied is from 1 to 30 $kg/cm^2$.

The applied pressure in this integration step (e) exerts an influence on bonding strength. It is preferable that the applied pressure is controlled in the range of 1 to 50 $kg/cm^2$ in the direction of the thickness of the flat electrode plate assembly. When the applied pressure falls below 1 $kg/cm^2$, the bonding strength is reduced and, conversely, when the applied pressure surpasses 50 $kg/cm^2$, the degree of porosity of the surface polymer layer declines and it thus becomes difficult to retain a non-aqueous electrolyte. That is, application of pressure beyond the aforesaid range may result in deterioration in characteristics of a battery to be obtained.

Meanwhile, the heating temperature slightly differs depending on the material of the surface polymer layer and the applied pressure. When the temperature is too law, bonding becomes insufficient; when the temperature is too high, the battery capacity shows a tendency to decrease. From the perspective described above, the preferable heating temperature is from 80 to 100° C.

Hence the aforesaid integration step (e) allows suppression of deterioration in cycle characteristic and storage characteristic caused by expansion and shrinkage of the electrode plate due to charge/discharge cycles or by generation of gas during storage at high temperatures.

Furthermore, it is preferable in the present invention that after the soakage step (d), the flat electrode plate assembly is adjusted to be in the state of indicating an open-circuit voltage of 3.5 V or higher, and then the step (e) is conducted, with the aforesaid state maintained.

Although the flat electrode plate assembly soaked in the electrolyte in the soakage step (d) can be subjected to the integration step (e) as it is, there is a possibility that the battery characteristics vary due to unstable potentials of the negative electrode desorbing no lithium. For avoiding this, it is preferable that the flat electrode plate is, even if slightly, brought into a charged state. In terms of control, the open circuit voltage of the flat electrode plate assembly after addition of the solution is preferably 3.5 V or higher. The additional step to bring about this state may be performed either in charging or discharging.

Further, when the electrode plate assembly is charged, it should not necessarily be in a fully charged state; the preferable operation is (i) charging the electrode plate assembly until the open circuit voltage of at least 3.5 to 4.0 V is indicated or (ii) charging/discharging the electrode plate assembly not less than once and then charging it until the open circuit voltage of at least 3.5 to 4.0 V is indicated. It is preferable, however, that the aforesaid charging operation or charging/discharging operation is conducted in the circumstance with the temperature in the vicinity of room temperature, and that gas, if generated, is discharged outside the case by the use of a back-flow prevention valve.

In the following, the present invention will be described by reference to drawings; however, it is not limited thereto:

EXAMPLE

In the present example, batteries comprising an electrode plate A as a positive electrode and an electrode plate B, on which a porous polymer layer would be formed, as a negative electrode was fabricated.

(1) Battery Group A

A positive electrode was prepared as follows: 100 parts by weight of $LiCoO_2$ as an active material was added with 3 parts by weight of carbon black to obtain a mixture. This mixture was then added with an NMP solution with 12 wt % of PVdF dissolved therein such that 6 parts by weight of a resin component as a binder material was contained, followed by mixing, to prepare a positive electrode material mixture. The obtained positive electrode material mixture was applied onto each face of aluminum foil with a thickness of 20 µm by a known method, which was then dried, pressurized and cut out to obtain a positive electrode plate with a thickness of 150 µm containing PVdF as the resin component of the binder.

A negative electrode was prepared as follows: 100 parts by weight of a graphite powder as an active material was added with an emulsion containing 40 wt % of SBR fine particles such that 3 parts by weight of a resin component as a binder material was contained, followed by mixing, to prepare a negative electrode material mixture. The obtained negative electrode material mixture was applied onto copper foil with a thickness of 15 µm by a conventional method, which was then dried, pressurized and cut out to obtain a negative electrode plate with a thickness of 150 µm containing SBR as the resin component of the binder (the electrode-plate preparation step (a)).

Next, a 10 wt % solution (PVdF-HFP/NMP) obtained by dissolving a copolymer composed of PVdF and HFP in a molar ratio of 88:12 in NMP was applied onto each surface of the negative electrode plate, to form a coating layer with a thickness of 20 µm. After the application, the negative electrode plate was immersed in water to replace NMP with water and further dried to form a porous polymer layer comprising PVdF which was the same resin material as the binder of the positive electrode (the separator preparation step (b)).

A lead was attached to each of the positive electrode and the negative electrode with the porous polymer layer formed on the surface thereof, the positive electrode and the negative electrode were laminated via the porous polymer layer, and the obtained laminate was wound up in oblong form while the porous polymer layer and the positive electrode were still in a non-bonding state. Moreover, pressure was applied to the wound up laminate in the direction of the thickness thereof to prepare a flat winding type electrode plate assembly having a design capacity of 650 mAh (the electrode-plate-assembly formation step (c)).

Subsequently, the flat electrode plate assembly was accommodated in a rectangular aluminum-made case, the lead of the positive electrode and that of the negative electrode in the flat electrode plate assembly were bonded to an aluminum-made sealing plate equipped with a safety valve, and the case was integrated with the sealing plate by laser welding. In this state, part of the sealing plate was provided with a hole to serve as an inlet port for the electrolyte.

With the inside of the case held in a depressurized state, a predetermined amount of non-aqueous electrolyte as the electrolyte was poured through the inlet port. The electrolyte used here was obtained by dissolving 1.25 M of $LiPF_6$ in a mixed solvent containing ethylene carbonate (EC) and ethyl methyl carbonate (EMC) in a volumetric ratio of 1:3. The electrode plates got wet with this electrolyte and the electrode plate assembly was soaked therein (the soakage step (d)).

The electrode plate assembly was then charged at a current of 130 mA until a voltage reached 3.8 V. Gas generated in charging/discharging was released from the case. It is to be noted that after the charge, the open-circuit voltage of 3.5 to 4.0 V was confirmed. In this state, the inlet port was sealed by bonding an aluminum plate thereto by laser welding so as to be in a completely sealed state.

Subsequently, the battery was interposed between pressurizing plates made of stainless steel insulatingly coated with a resin and, while a load of 10 $kg/cm^2$ was applied to a projection area in the direction of the thickness of the electrode plate assembly, the battery was heated under circumstances with the temperature of 60, 70, 80, 90, 100 or 110° C. for 30 minutes, and then cooled to room temperature (the integration step (e)). Batteries obtained at those respective temperatures were referred to as Battery 1, Battery 2, Battery 3, Battery 4, Battery 5 and Battery 6 (a battery group A).

(2) Battery Group B

Except that a PVdF/NMP solution obtained by dissolving 10 wt % of PVdF in NMP as the polymer material for the porous polymer layer to be formed on the surface of the negative electrode was used, batteries were fabricated in the same manner as those of the battery group A. The batteries fabricated at a heating temperature of 60, 70, 80, 90, 100 or 110° C. were referred to as, respectively, Battery 7, Battery 8, Battery 9, Battery 10, Battery 11 and Battery 12 (a battery group B).

(3) Battery Group C

Batteries using a different sort of resin component from the surface polymer layer for the binder of the positive electrode, which was the counter electrode, were obtained here. Except that a PTFE dispersion was used for the binder of the positive electrode, batteries were fabricated in the same manner as those of the battery group A. The batteries fabricated at a heating temperature of 60, 70, 80, 90, 100 or 110° C. were referred to as, respectively, Battery 13, Battery 14, Battery 15, Battery 16, Battery 17 and Battery 18 (a battery group C).

(4) Battery Group D

A battery constituted using a porous (microporous) film separator conventionally in frequent use was obtained here. Except that a PTFE dispersion was used for the binder of the positive electrode and a porous film made of polyethylene (PE) was provided instead of forming the porous polymer layer on the surface of the negative electrode, and the integration step (e) in which the electrode plate assembly was heated in a pressurized state was thus omitted, a battery was fabricated in the same manner as those of the battery group A. The obtained battery was referred to as Battery 19 (a battery group D). The characteristics of the battery groups A to D constituted above were summarized in Table 1.

TABLE 1

| Battery group | Positive electrode polymer material | Negative electrode polymer material | Separator |
|---|---|---|---|
| A | PVdF | SBR | Porous polymer layer comprising PVdF-HFP |
| B | PVdF | SBR | Porous polymer layer comprising PVdF |
| C | PVdF | SBR | Porous polymer layer comprising PVdF-HFP |
| D | PVdF | SBR | PE separator |

Next, the battery characteristics of each battery of the battery groups shown above were investigated and the results were summarized in Table 2.

TABLE 2

| Battery | Battery group | Heating temperature (° C.) | Internal resistance (mΩ) | 2 C/0.2 C capacity (%) | Capacity recovery rate (%) |
|---|---|---|---|---|---|
| 1 | A | 60 | 59 | 80 | 68 |
| 2 | A | 70 | 60 | 83 | 70 |
| 3 | A | 80 | 53 | 87 | 77 |
| 4 | A | 90 | 48 | 90 | 79 |
| 5 | A | 100 | 47 | 91 | 79 |
| 6 | A | 110 | 47 | 87 | 78 |
| 7 | B | 60 | 62 | 79 | 69 |
| 8 | B | 70 | 63 | 82 | 70 |
| 9 | B | 80 | 57 | 86 | 75 |
| 10 | B | 90 | 50 | 89 | 78 |
| 11 | B | 100 | 49 | 90 | 78 |
| 12 | B | 110 | 49 | 88 | 77 |
| 13 | C | 60 | 58 | 81 | 70 |
| 14 | C | 70 | 58 | 81 | 69 |
| 15 | C | 80 | 60 | 80 | 71 |
| 16 | C | 90 | 61 | 82 | 70 |
| 17 | C | 100 | 60 | 81 | 68 |
| 18 | C | 110 | 59 | 80 | 67 |
| 19 | D | — | 52 | 86 | 71 |

First, internal resistances of the batteries were measured with the use of a battery resistance measurement device. The internal resistance of Battery 19 in the conventional example was 52 mΩ. As apparent from Table 2, with respect to the batteries of the battery group A and the battery group B, the internal resistance declined remarkably when the heating temperature exceeded 70° C. As opposed to this, as to the battery group C, there was observed no decline in internal resistance even with increasing heating temperature. Accordingly, when the heating temperature exceeded 80° C., the batteries of the battery group A and the battery group B began to gain superiority over the other batteries.

As a result of decomposing the batteries, it was revealed that the electrode plate assemblies of Batteries 3 to 6 and 9 to 12 having indicated low internal resistance were so tightly welded and bonded as not to be readily decomposed by separation. As opposed to this, Batteries 1, 2, 7 and 8, and the batteries of the battery group C were in the state that the electrode plate assembly could be decomposed with ease.

This was resulted from the fact that when the main component of the porous polymer layer was the same material as the polymer material contained in the binder of the counter electrode, provision of appropriate pressurizing and heating conditions in the soaked state enabled integration of the electrode plate assembly via the porous polymer layer in a favorably adhering state, resulting in formation of favorable ion conductivity. When a conventional separator was used, on the other hand, a flat electrode plate assembly was not integrated with success. Moreover, when the sort of component contained in the porous polymer layer differed from that of the binder of the counter electrode, preparation of a winding type electrode plate assembly merely by adhesion of the porous polymer layer to the surface of the electrode plate did not result in integration because the bonding was unsuccessful.

Next, in the state that the aforesaid batteries were fully charged, discharge capacities in discharging at 130 mA (0.2 C) and 1,300 mA (2.0 C) were measured, and ratios of the capacity at 2 C to the capacity at 0.2 C (2 C/0.2 C capacities) were determined, as indicators of high-rate discharge characteristics of the batteries, which were also shown in Table 2.

It was found from Table 2 that with regard to the batteries of the battery group A and the battery group B using, as the polymer material of the binder for the positive electrode, the same sort of PVdF-HFP or PVdF as the main component of the porous polymer layer formed on the surface of the negative electrode, the 2 C/0.2 C capacity begun to increase linearly when the heating temperature exceeded 70° C., it reached the maximum at 100° C., and then slightly decreased when the temperature further increased. As opposed to this, the batteries of the battery group C indicated no particular improvement attributed to the same pressurization and heating. As to Battery 19 of the conventional example, the 2 C/0.2 C capacity thereof showed 86%, which was relatively a low value. Accordingly, the batteries of the battery group A and the battery group B began to gain superiority over the other batteries when the heating temperature exceeded 80° C. Particularly, Batteries 4, 5, 10 and 11 at a heating temperature of 90 to 100° C. are superior to the other batteries.

The above results were the same as the tendencies of the aforesaid internal resistance and obtained due to improvement in internal resistance and rapid discharge characteristic.

As the last one of the characteristics represented in Table 2, a capacity recovery rate at 0.2 C of each battery after storage under circumstances with the temperature of 85° C. for three days was measured. It was found from Table 2 that with regard to the batteries of the battery group A and the battery group B using, as the polymer material of the binder for the positive electrode, the same sort of PVdF-HFP or PVdF as the main component of the porous polymer layer formed on the surface of the negative electrode, the capacity recovery rate increased when the heating temperature exceeded 70° C., it reached the maximum at 90 to 100° C., and then slightly decreased when the temperature further increased. As to Battery 19 of the conventional example, the capacity recovery rate thereof showed 71%, which was relatively a low value. Accordingly, the batteries of the battery group A and the battery group B began to gain superiority over the other batteries when the heating temperature exceeded 80° C. Particularly, Batteries 4, 5, 10 and 11 at a heating temperature of 90 to 100° C. are superior to the other batteries.

The above results were the same as the tendencies of the aforesaid internal resistance and the 2 C/0.2 C capacity. This is supposedly because separation or buckling of the electrode plate caused by generation of gas during storage, namely gas trapping within the electrode, was suppressed in the batteries showing the high capacity recovery rate since the electrode plates therein were integrated.

Next, charge/discharge cycle characteristics of the aforesaid batteries were investigated, using conditions of a constant current-constant voltage charge of 0.7 C-4.2 V and discharge at 1 C until the voltage reached 3.0 V. As one example of the results, relationships between the charge-discharge cycles and the battery capacity ratio of Battery 4 as the typical example of the present invention and Batteries 16 and 19 as the comparative examples were shown in FIG. 1. The vertical axis indicates the discharge capacity calculated on the assumption that the capacity at the first cycle was 100%.

As evident from FIG. 1, Battery 4 with the electrode plates integrated exhibited a more favorable cycle characteristic compared to Batteries 16 and 19 with the electrode plates not integrated. This is supposedly because expansion and shrinkage of the electrode plate due to the cycles or separation and buckling caused by generation of gas was suppressed.

Figure 2:
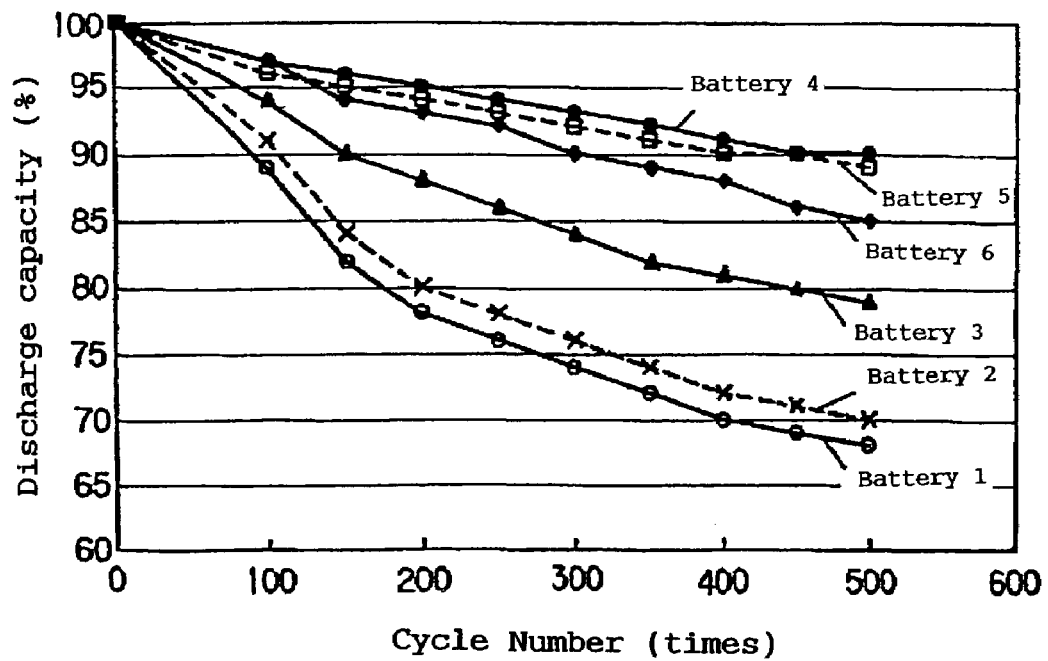
FIG. 2 is a graph representing the cycle number-discharge capacity relationships of the batteries in the battery group A.

Furthermore, a relationship between the charge/discharge cycles and the battery capacity ratio of each battery of the battery group A was shown in FIG. 2. The vertical axis indicates the discharge capacity calculated on the assumption that the capacity at the first cycle was 100%, as in FIG. 1.

As obvious from FIG. 2, the cycle characteristic was unfavorable until the heating temperature increased to 60 or 70° C. However, the cycle characteristic showed improvement at 80° C., and the rate of capacity deduction due to the cycles decreased remarkably and the cycle life characteristic improved at 90 or 100° C. At 110° C., the better battery characteristic than that at 60 to 80° C. was exhibited, but slightly decreased from that at 100° C. It was therefore found that the aforesaid characteristic is also similar to those results obtained in Table 2.

In comparison among the external appearances of the batteries during the cycles, on the other hand, there was observed almost no deformation in the direction of the thickness of the batteries, which exhibited excellent cycle life characteristics, while there was observed some deformation in the direction of the batteries, which exhibited unfavorable cycle characteristics. This is to indicate that adequate selection of the polymer material and the adequate pressurization and heating in accordance with the present invention not only allows improvement in ion conductivity of the bonding part but also causes occurrence of resistance in the direction of the thickness of the winding type electrode plate assembly, bringing about a long-term, stable cycle characteristic.

It should be noted that the pressure applied to the winding type electrode plate assembly in the integration step in the present example was described when it is on condition that a load of 5 kg/cm$^2$ was added to the projection area in the direction of the thickness of the electrode plate assembly. The result of a detailed study separately conducted on the pressurizing condition according to the present example will be described below:

That is to say, in the configuration of the present invention, batteries were fabricated in the same manner as in the previous example by changing a load as the applied pressure in the range of 0 to 100 kg/cm$^2$ on the four temperature conditions of 80, 90, 100 and 110° C. As a result, the optimum applied pressure to satisfy the battery characteristics was in the range of 1 to 50 kg/cm$^2$. A problem might occur that the electrode plate assembly is difficult to bond when the applied pressure is lower than this optimum range and, conversely, the high-rate discharge characteristic decreases when the applied pressure is higher than the aforesaid range.

As revealed from the above, according to the method for fabricating a lithium ion secondary battery of the present invention, the strongly integrated configuration of the electrode plate assembly can solve the problem conventionally on issue, prevent displacement by wind-up and buckling of the bonded electrode plate assembly and achieve a configuration having resistance to the direction of the thickness of a flat winding type electrode plate assembly, and it is therefore possible to provide a new method for fabricating a lithium ion secondary battery excellent in storage characteristic as well as cycle characteristic.

It is to be noted that in the above example, the surface polymer layer was formed on the surface of the negative electrode and the counter electrode containing the same sort of resin component as the surface polymer layer was made the positive electrode, the welding and bonding effect of the flat winding type electrode plate assembly can be obtained even if the aforesaid positive electrode and negative electrode are opposite.

As thus described, according to the method for fabricating a lithium ion secondary battery using a flat winding type electrode plate assembly in the present invention, a lithium ion secondary battery excellent in cycle characteristic and storage characteristic is readily and certainly realized by avoiding buckling of the electrode plate assembly and separation of a separator layer to integrate the electrode plate assembly.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for fabricating a lithium ion secondary battery comprising the steps of:
    (a) preparing an electrode plate A comprising an active material capable of absorbing and desorbing lithium ions and a binder mainly composed of a polymer material "a", and an electrode plate B comprising an active material capable of absorbing and desorbing lithium ions and a binder mainly composed of a polymer material "b";
    (b) preparing a separator by forming on said electrode plate B a porous polymer layer mainly composed of said polymer material "a" or a copolymer of said polymer material "a";
    (c) forming a flat electrode plate assembly by laminating in mutual opposition said electrode plate A and said electrode plate B via said separator to be a laminate and winding up said laminate in flat form;
    (d) soaking said flat electrode plate assembly in a non-aqueous electrolyte to obtain a soaked state by accommodating said flat electrode plate assembly and said non-aqueous electrolyte in a battery case; and
    (e) integrating said flat electrode plate assembly in the adhering state by heating said flat electrode plate assembly still in the soaked state at a heating temperature of 80° C. to 100° C., followed by cooling, while applying pressure in a direction of thickness of said flat electrode plate assembly.

2. The method for fabricating a lithium ion secondary battery in accordance with claim 1, characterized in that said polymer material "a" is polyvinylidene fluoride.

3. The method for fabricating a lithium ion secondary battery in accordance with claim 1, characterized in that said step (e) is a step for integrating said flat electrode plate assembly by heating said flat electrode plate assembly still in the soaked state at a heating temperature of 80 to 100° C., followed by cooling to room temperature, while applying pressure of 1 to 50 kg/cm$^2$ in a direction of thickness of said flat electrode plate assembly.

4. The method for fabricating a lithium ion secondary battery in accordance with claim 1, characterized in that, after said step (d), said flat electrode plate assembly is adjusted to be in a state of indicating an open-circuit voltage of 3.5 V or higher, and then said step (e) is conducted, with said state maintained.

* * * * *